Oct. 30, 1962     R. MURPHY     3,061,370
TRAVELERS ACCESSORY CASE
Filed July 22, 1960     3 Sheets-Sheet 1
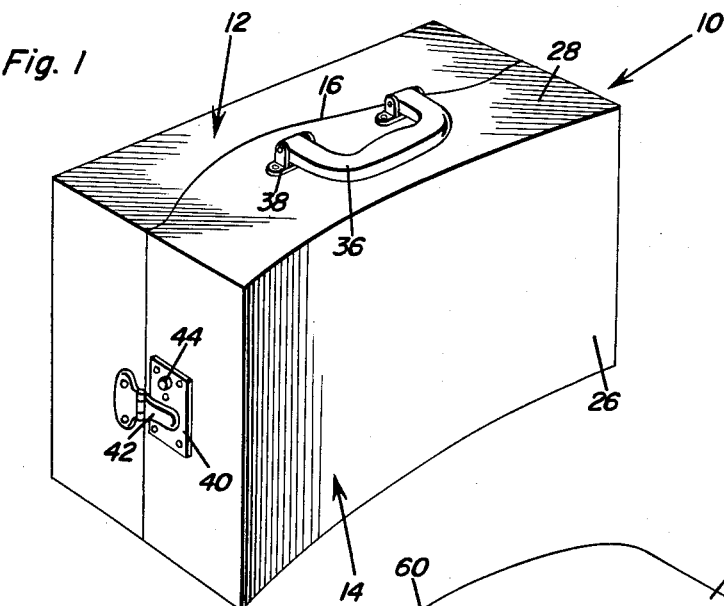
Fig. 1
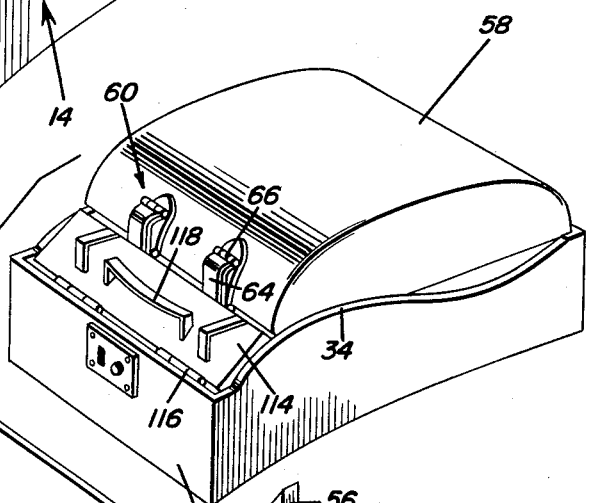
Fig. 2
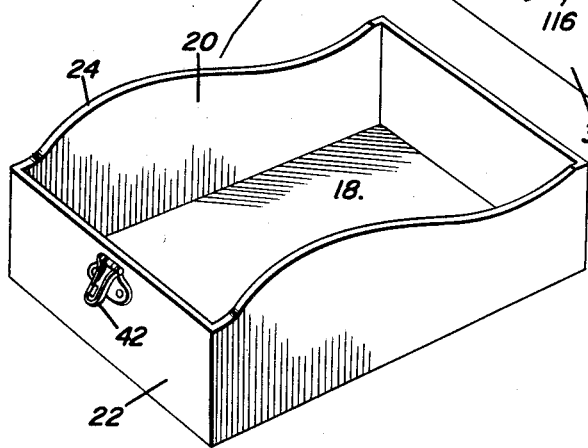
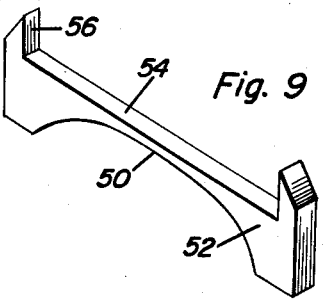
Fig. 9
Raymond Murphy
INVENTOR.
BY *Lawrence A. O'Brien*
*and Harvey B. Jacobson*
Attorneys Oct. 30, 1962 R. MURPHY 3,061,370
TRAVELERS ACCESSORY CASE
Filed July 22, 1960 3 Sheets-Sheet 2

Raymond Murphy
INVENTOR.

Oct. 30, 1962 R. MURPHY 3,061,370
TRAVELERS ACCESSORY CASE
Filed July 22, 1960 3 Sheets-Sheet 3
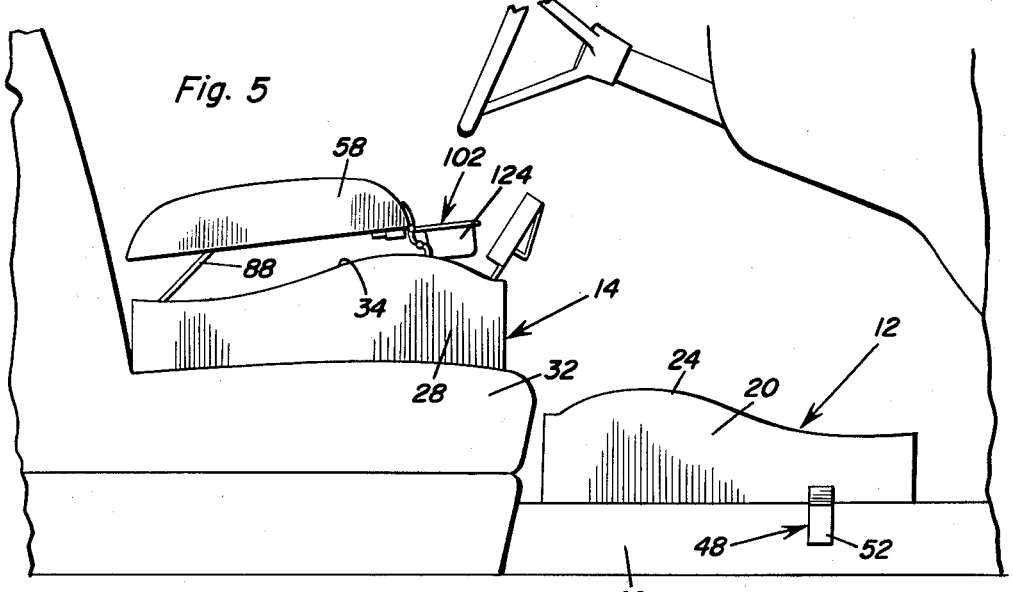
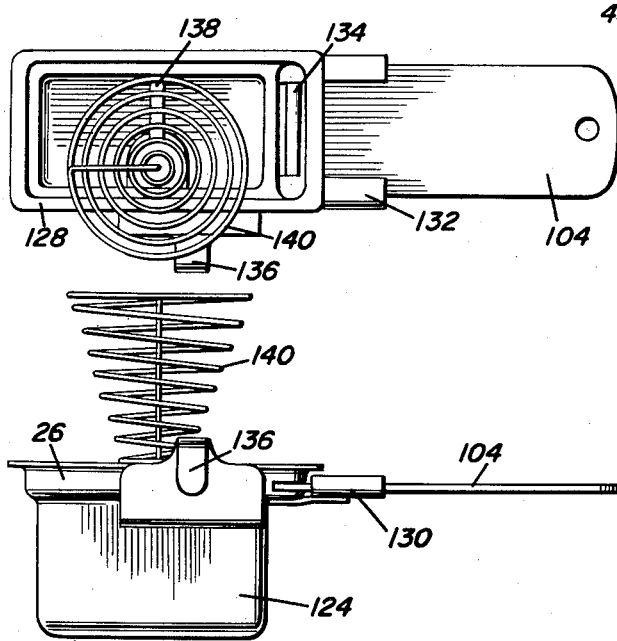
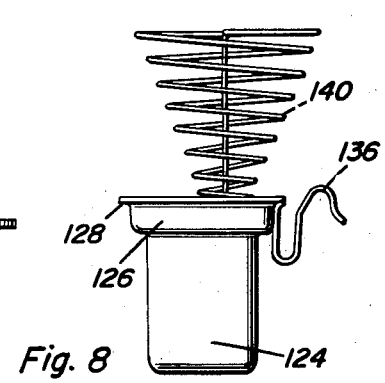
Raymond Murphy
INVENTOR.

United States Patent Office 3,061,370
Patented Oct. 30, 1962

3,061,370
TRAVELERS ACCESSORY CASE
Raymond Murphy, Tulsa, Okla., assignor of fifty percent
to Ferol Marine Murphy, Tulsa, Okla.
Filed July 22, 1960, Ser. No. 44,631
5 Claims. (Cl. 297—194)

The present invention generally relates to an accessory case and more particularly to such a case for use by motorists for use in providing an arm rest for the driver or the passenger together with many other features which enhance the utility of the device.

Briefly, the accessory case of the present invention is primarily intended for use by motorists but is also adaptable for use by person travelling on a boat, train, airplane, automobile and even capable of use at home. The device includes an arm rest having a padded cushion thereon, a convenient ash receptacle, a night light, a compartment for carrying smoking supplies such as pipes, tobacco, cigarettes, matches and the like, a compartment for carrying items of convenience and safety which cannot be conveniently carried in a glove compartment such as an electric razor, first aid kit, sun glasses, travel light, whisk broom, make-up kit, overnight travel kit, tissues, road maps and the like with the compartment and contents thereof being easily removable. The present invention further features a rolling plastic covered map for quick and easy reference while travelling, a removable cover for the unit which is adapted to mount over the floor tunnel between the firewall and the front seat of a vehicle which provides a convenient tray for magazines, stationery, literature, books, purses, snacks and the like or for use as a waste basket.

Also available is a memo pad and pencil, vanity kit including a mirror, file and comb mounted on the underside of the cushion of the arm rest for quick and easy access. The arm rest is provided with a cushion sufficiently wide so that both the driver and the passenger may use the cushion and also may use the storage compartments. The present invention is completely portable and is constructed in such a manner that it is well balanced and easy to carry either with the cover in place or with the cover removed. The device is constructed of a scuff-proof material which is colored in such a manner to blend with most types of upholstery and includes attractive hardware such as a plastic handle, key lock, chrome hardware, and additionally, the device may be used as a seat for a child when desired.

When the device is to be used at home or in the home, it is a convenient and comfortable divider for use on a couch or the like and provides a handy compartment for storage of poker chips, cards, checkers, smoking supplies, reading glasses and the like. Further, the case is ideal for carrying essentials to and from hotel, motel, beach or any other place the salesman, traveler or vacationer requires the contents of such a case. The case may also be used as a tackle box for fishermen and is quite simple to use, easy to carry, contoured to rest securely on upholstered surfaces, long lasting and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the accessory case of the present invention with the cover assembled with the arm rest portion of the case;

FIGURE 2 is a perspective view illustrating the cover when removed from the arm rest;

FIGURE 5 illustrates the present invention disposed within an automobile;

FIGURE 6 is a top plan view of a cigarette ash tray and extinguisher forming a part of the present invention;

FIGURE 7 is a side elevational view of the construction of FIGURE 6;

FIGURE 8 is an end elevation of the construction of FIGURE 6; and

FIGURE 9 is a perspective view of the support for holding the cover in position on the tunnel in the floorboard of the vehicle.

Figure 3:
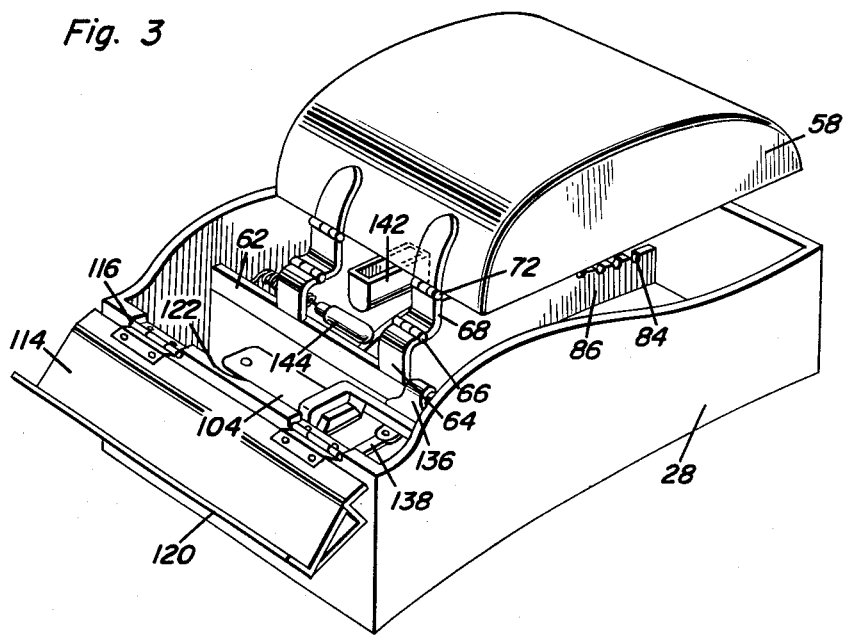
FIGURE 3 is a perspective view of the arm rest portion of the case illustrating the cushioned pad in elevated position and illustrating the end compartment opened.

Referring now specifically to the drawings, the numeral 10 generally designates the accessory case of the present invention which includes a cover or upper case generally designated by the numeral 12 and a bottom or lower case generally designated by the numeral 14 joined together along a line of juncture 16 which has an arcuate curved configuration generally in the form of an ogee curve.

As illustrated in FIGURE 2, the cover 12 includes a top wall 18, side walls 20 and end walls 22. The side walls 20 have a curved edge 24 which forms part of the line of juncture 16. The bottom or lower case 14 includes a bottom wall 26, side walls 28 and end walls 30 so that when the cover 12 and bottom 14 are assembled, a generally rectangular carrying case is provided. The bottom wall 26 is concavely arcuate as illustrated in FIGURE 1 so that it conforms to the curvature of a vehicle seat 32 when installed in a vehicle and the upper edges of the side walls 28 are also arcuately curved as indicated by the numeral 34 for fitting the arcuate edges 24 of the side walls 20.

The bottom or lower case 14 is provided with a U-shaped handle 36 secured to the side wall 28 by brackets 38. Lock means is provided on the end walls 22 and 30 for securing the bottom 14 to the cover 12 and includes a lock plate 40 and a latch member 42. The lock plate 40 is mounted on the end wall 30 and receives a latch member 42 pivotally mounted on the end wall 22. The lock plate 40 is provided with a releasing member 44 which may be provided with a key operated lock for securing the cover 12 in position in closing relation to the bottom 14. Also, the bottom 14 may be constructed of one color while the cover or top 12 is constructed of another color thereby enhancing the appearance of the device.

The cover 12 is adapted to be disposed in overlying relation to the normally provided upwardly projecting tunnel 46 in the vehicle and an adapter 48 is provided for supporting the cover 12 in position. The adapter generally designated by the numeral 48 is provided with an arcuate recess 50 in the lower edge thereof and generally is in the form of a relatively thin plate-like member 52. Also, a rectangular recess 54 is provided in the upper edge thereof which recess is defined by upstanding lugs or projections or end pieces 56 which engage the side walls 20 of the cover 12 for retaining the cover 12 along the top surface of the tunnel in the floorboard with the arcuate surface 50 receiving the arcuate curvature of the tunnel in the floorboard of the vehicle thereby securely retaining the cover in position and also enabling access to be had to the cover for depositing trash or otherwise supporting articles in convenient reach of the operator and any passenger that may be in the vehicle.

To facilitate operation and handling of the cover, a handle is provided on the inner surface of one end wall so that the cover may be lifted upwardly by such a handle and one side wall is provided with a pair of spherical roller type casters which also are provided on the side wall of the bottom for rollingly supporting the device along a supporting surface if so desired.

As illustrated in various figures of the drawings, the lower case or bottom 14 includes a cushioned arm rest pad 58 that is hingedly attached by hinge means generally designated by the numeral 60 to a transverse partition plate 62 which is rigid with the side walls 28. The hinges 60 are provided with an upwardly offset and curved mounting plate 64 attached to the partition wall with a hinge axis 66 at the upper end thereof together with an intermediate plate 68 carried by the hinge axis 66 and attached to a mounting plate 70 on the bottom of the arm rest by virtue of a hinge axis 72 thus providing a double axis hinge 60 for connecting the end portion of the seat cushion to the transverse partition wall 62.

Figure 4:
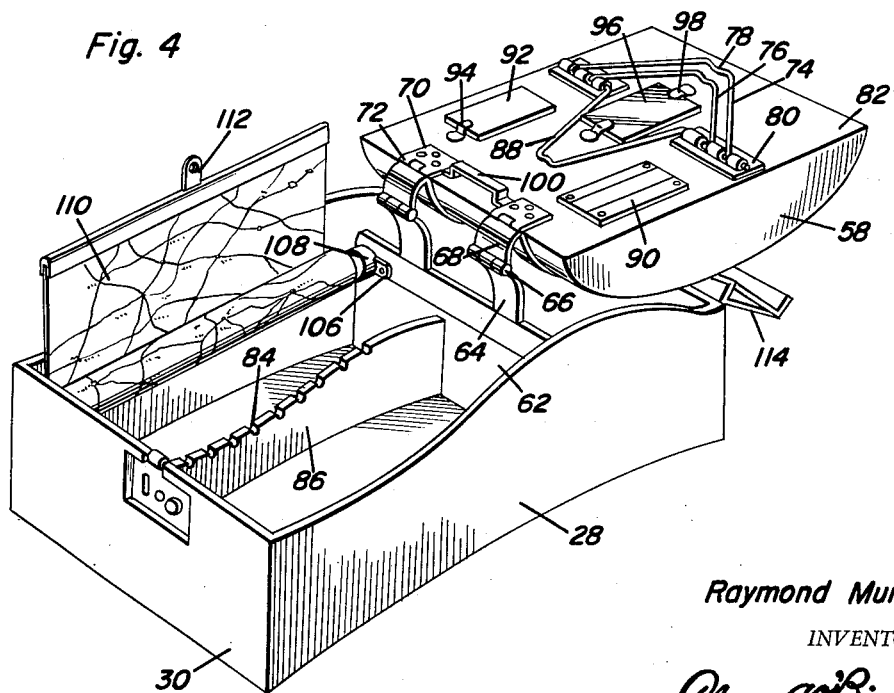
FIGURE 4 is a perspective view of the device with the cushion pivoted forwardly to an inoperative position.

The hinge axis 72 is of the type which will limit the movement of the pad or cushion 58 in one direction thus enabling the end portion of the cushion 58 attached to the hinge means 60 to be elevated to the position illustrated in FIGURE 3 and supported in this positon since the hinge axis 72 will not permit it to move further towards the end wall adjacent the transverse partition 62. For supporting the other end of the cushion adjustably, there is provided a pair of U-shaped wire rod supports or props 74 and 76 each of which is provided with a recess 78 in the bight portion thereof and each of which is frictionally hingedly mounted by brackets 80 on the bottom plate or undersurface 82 of the arm rest cushion 58. The notch or recess 78 is adapted to engage one of a plurality of longitudinally spaced notches 84 in a longitudinal partition plate 86 extending between the transverse partition 62 and a remote end wall 30 as illustrated in FIGURE 4. The upper edge of the longitudinal partition 86 is curved so that by engaging selective of the supports or props 74 and 76 with selective notches 84, the cushion 58 may be rigidly supported in an elevated position with the hinge member 72 preventing pivotal movement in one direction and the prop either 74 or 76 preventing movement in the other direction.

A third support or prop 88 is provided similar to the props 74 and 76 but longer than the props 74 and 76 with the leg or prop 88 being disposed inwardly towards the hinges 60. Each of the props is frictionally pivotally supported by the bracket 80.

Also mounted on the undersurface or plate 82 of the cushion is a carrying case 90 for a comb and a fingernail file. Adhesively secured to the plate or undersurface 82 is a memo pad 92 having a pencil connected thereto together with a pivotal lock member 94 which retains the cover of the memo pad 92 in closed position. The back of the memo pad 92 is adhesively secured to the plate 82 thus retaining the memo pad in closed position and readily available for access. Also provided centrally in the back plate or under plate 82 is a mirror 96 supporting by a pair of pivotal clips 98 which retain the mirror in position or enables it to be stored in the case 90 provided therefor. With the mirror in position, it may be used as a vanity mirror or the like for such use as this type of mirror is capable of being effectively employed. The end edge of the cushion remote from the hinge means may preferably be provided with a lift tab of flexible material which enables the cushion member to be pivoted by grasping the tab or handle in the usual manner.

Intermediate the attaching plate 70 for the hinge means 60, there is provided a U-shaped attaching bracket 100 for detachably receiving an ash receptacle generally designated by the numeral 102 which includes a laterally extending arm 104 adapted to be inserted under the bracket 100 and secured thereto by any suitable means such as a setscrew or the like. When the plate 104 is inserted into the bracket 100, the receptacle 102 will be disposed outwardly of the edge of the cushion as illustrated in FIGURE 5 and also in FIGURE 3.

Mounted on end brackets 106 on the end wall 30 and the partition wall 32 is a spring roller 108 having a map 110 coiled thereon which has a hook or tab 112 to detachably connect with the other side wall 28 whereby the map may be unrolled to a desired degree for ready reference while travelling with the map lying across the upper edge of the compartment formed by the partition wall 62 and the other walls as illustrated in FIGURE 4.

When the supporting braces or arms are collapsed and the cushion lowered so that it forms a closure for the compartment, the cushion may be provided with a snap catch for retaining it in position. A night light may be provided in the compartment under the cushion and the night light may be connected with the power of the battery of the automobile by virtue of a plug for insertion into the cigarette lighter.

Disposed forwardly of the partition wall 62 is a hingedly attached lid 114 secured in place by supporting hinges 116 which forms a closure for the small compartment between the partition wall 62 and the adjacent end wall 30. The upper surface of the lid 114 is provided with a handle 118 for lifting the device and the lid 114 is provided with a depending flange 120 having slits therein so that cards or elements of paper may be supported in position when the lid is open. This compartment is provided with a pair of notches 122 therein curved to conform to soft drink bottles so that a pair of soft drink bottles may be set in the compartment and retained in position. Also, this compartment may be employed for holding cigarettes, matches, sun glasses and the like and also will form a storage area for the ash tray so that the ash tray may be employed when the cushion is in its lowered position rather than in its elevated position.

FIGURES 6-8 illustrates the details of the ash receptacle 102 which includes an outer rectangular receptacle 124 which is removably received within an upper annular member 126 having an outwardly extending flange 128 whereby the receptacle 124 may be moved upwardly through the flange and ring 126 for removal thereof for emptying the ashes therefrom. Extending laterally from one edge of the annular ring 126 is a guide member and bracket 130 having inturned lugs 132 slidably receiving the plate 104 thus enabling the plate 104 to be moved inwardly to an overlying relation to the receptacle for forming a closure therefor or moved to an open position wherein the plate 104 then may be inserted into the bracket 100 for detachably supporting the ash receptacle on the elevated cushion. The inner end of the plate 104 is provided with an upstanding handle or lug 134 thereon for ease of manipulation thereof and the guide 130 will frictionally grip the plate 104 to retain it in longitudinally adjusted position and when the plate 104 is in closed position, it will also prevent the removal of the receptacle 124.

Attached to one side of the annular ring 126 is a supporting clip 136 which detachably and frictionally engages the transverse partition 62 as illustrated in FIGURE 3 for retaining the ash receptacle in the compartment formed by the partition 62. Also, the receptacle 124 is provided with a transverse member 138 extending centrally across the top edge thereof which has a socket for receiving the lower end of a spiral coil spring 140 which will frictionally grip and retain cigarettes and which also will act as a cigarette extinguisher if the cigarette is extending downwardly into the coil spring 140 so that it will be extinguished. When the cushion 58 is employed in elevated position as illustrated in FIGURE 3, a smaller ash receptacle 142 may be attached to the bracket 100 by a suitable plate if desired. Also, the night light is indicated by the numeral 144 and is provided with a clip type bracket for engagement with the partition wall 62 or any other suitable support.

A plastic cover may be provided for covering the open upper end of the cover or also the open upper end of the bottom. If the cover is used for a food tray, then the plastic cover may be held up from the food by providing a pair of U-shaped wire bails connected with the ends of the cover for supporting the plastic cover in elevated position above the food. The plastic cover may be provided with a zipper type closure for an opening therein for providing access through the cover.

The inner surface of the lid 114 may be provided with a device for holding a pack of cigarettes such as a suction cup, socket or the like and the hinges 116 are also of the double type so that the lid 114 may be disposed in the position illustrated in FIGURE 3 or in the position illustrated in FIGURE 5 with the lid extending upwardly in an angular relation.

With the present invention, many various and sundry articles may be disposed in the compartments. Further, the cushion pad may be adjusted both vertically and angularly to orientate the cushion pad in the optimum position for drivers to rest their arms while at the same time having finger tip access to various utilitarian items such as cigarettes, matches and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An accessory case comprising a generally parallelepiped case having a lower section and a removable cover, means detachably connecting the cover to the lower section of the case, a cushion mounted in the lower section and projecting upwardly above the edge of the lower section for forming an arm rest when the cover is removed, and means mounting the cushion on said lower section for vertical and angular adjustment relative thereto for orientating the cushion in proper position for engagement by the arm, one end edge of said cushion hingedly attached to the lower section for pivotal movement of the cushion to a position with the cushion inverted, the underside of the cushion having a rigid plate-like member incorporated therein, for use as an article supporting surface.

2. An accessory case comprising a generally parallelepiped case having a lower section and a removable cover, means detachably connecting the cover to the lower section of the case, a cushion mounted in the lower section and projecting upwardly above the edge of the lower section for forming an arm rest when the cover is removed, and means mounting the cushion on said lower section for vertical and angular adjustment relative thereto for orientating the cushion in proper position for engagement by the arm, said means mounting the cushion on the lower section including a double hinge means connecting one end edge of the cushion to the lower section with one of said hinge means having limited movement for permitting the end edge of the cushion to swing upwardly and longitudinally in an arcuate manner and for retaining the end edge of the cushion having the hinge means thereon in elevated position, and a plurality of different length props hingedly mounted on the cushion adjacent the other end thereof for seclective engagement with the lower section for supporting the other end of the cushion at different elevations thereby forming means for varying the angular position of the cushion, said hinge means and prop cooperating to retain said cushion in an elevated position.

3. The structure as defined in claim 2, wherein said lower section is provided with a longitudinal partition underlying the plurality of props for engagement thereby, each prop having a transverse rod and said partition having a plurality of longitudinally spaced notches for receiving the transverse rod.

4. An arm rest for vehicles comprising a generally parallelepiped receptacle, a cushion mounted in the receptacle and projecting above the upper edge thereof for forming an arm rest, means mounting the cushion on the receptacle for vertical and angular adjustment relative thereto for orientating the cushion in proper position for engagement by the arm, said means including a rigid backing plate for the cushion, a transverse partition in the receptacle, and double hinge means interconnecting the partition and the rigid backing plate enabling the end edge of the cushion remote from the hinge means to swing upwardly and longitudinally in an arcuate manner and for retaining the end edge of the cushion having the hinge means thereon in elevated position, and a prop member hingedly mounted on the backing plate adjacent the end thereof remote from the hinge means for selective engagement with the receptacle for supporting the other end of the cushion at different elevations depending upon the angular position of the prop member thereby forming means for adjusting the angular position of the cushion, said hinge means and prop cooperating to retain said cushion in an elevated position.

5. The structure as defined in claim 3 wherein said double hinge means is connected to the lower section inwardly of one end thereof so as to provide said lower section with a small compartment at one end of the cushion.

References Cited in the file of this patent
UNITED STATES PATENTS

| | | |
|---|---|---|
| 523,814 | Hussey | July 31, 1894 |
| 1,247,964 | Keller | Nov. 27, 1917 |
| 1,490,538 | Owen | Apr. 15, 1924 |
| 1,890,102 | Urquhart | Dec. 6, 1932 |
| 1,986,935 | Levine | Jan. 8, 1935 |
| 2,160,282 | Rehg | May 30, 1939 |
| 2,514,368 | Bradford | July 11, 1950 |
| 2,689,600 | Van Brieson | Sept. 21, 1954 |
| 2,692,638 | Castell | Oct. 26, 1954 |
| 2,704,114 | Williams | Mar. 15, 1955 |
| 2,713,925 | Alexander | July 26, 1955 |
| 2,751,967 | Sitterley | June 26, 1956 |
| 2,902,085 | Bahnson | Sept. 1, 1959 |
| 2,934,391 | Bohnett | Apr. 26, 1960 |